(12) United States Patent
Galli

(10) Patent No.: US 12,304,104 B2
(45) Date of Patent: May 20, 2025

(54) MILLING TOOL AND METHOD FOR PRODUCING SUCH A MILLING TOOL

(71) Applicant: Ledermann GmbH & Co. KG, Horb am Neckar (DE)

(72) Inventor: Oliver Galli, Nufringen (DE)

(73) Assignee: Ledermann GmbH & Co. KG, Horb am Neckar (DE)

( * ) Notice: Subject to any disclaimer, the term of this patent is extended or adjusted under 35 U.S.C. 154(b) by 776 days.

(21) Appl. No.: 17/479,746

(22) Filed: Sep. 20, 2021

(65) Prior Publication Data

US 2022/0088819 A1    Mar. 24, 2022

(30) Foreign Application Priority Data

Sep. 24, 2020  (EP) ..................................... 20197948

(51) Int. Cl.
    *B27G 13/00*    (2006.01)
    *B27C 9/02*     (2006.01)
(52) U.S. Cl.
    CPC .............. *B27G 13/002* (2013.01); *B27C 9/02* (2013.01)
(58) Field of Classification Search
    CPC ....... B27G 13/002; B23C 5/10; B23C 5/1027; B23C 5/1045; B23C 5/109
    See application file for complete search history.

(56) References Cited

U.S. PATENT DOCUMENTS

| 4,988,241 | A   | 1/1991  | Colligan       |           |
|-----------|-----|---------|----------------|-----------|
| 9,555,487 | B2  | 1/2017  | Hobohm         |           |
| 11,351,620| B2* | 6/2022  | Kress          | B23C 5/10 |
| 2006/0245838 | A1 | 11/2006 | Napflin    |           |
| 2007/0127996 | A1 | 6/2007  | Heinrich et al. |        |
| 2015/0135905 | A1 | 5/2015  | Maurer     |           |

FOREIGN PATENT DOCUMENTS

| DE | 10 2005 020 513 B3 | 9/2006  |
| DE | 10 2008 025 961 A1 | 12/2009 |
| EP | 1 772 220 A1       | 4/2007  |
| EP | 2 703 139 A1       | 3/2014  |
| EP | 2 859 975 A1       | 4/2015  |
| WO | 2012/163338 A1     | 12/2012 |

* cited by examiner

*Primary Examiner* — Matthew Katcoff
(74) *Attorney, Agent, or Firm* — Walter Ottesen, P.A.

(57) ABSTRACT

The disclosure relates to a milling tool for wood or wood-like materials, as well as a method for producing such a milling tool. A longitudinal direction, a radial direction and a rotational direction are specified by an axis of rotation of the milling tool. The milling tool includes a base body as well as at least one blade which adjoins a rake face pointing forward in the rotational direction and a flank face pointing outward in the radial direction. The blade and the rake face run in a curved manner in the longitudinal direction. The curved blade and the curved rake face are formed on a cutting plate formed separately from the base body. The cutting plate is fastened to and in particular soldered on with its flat inner surface on a flat support surface of the base body.

13 Claims, 3 Drawing Sheets

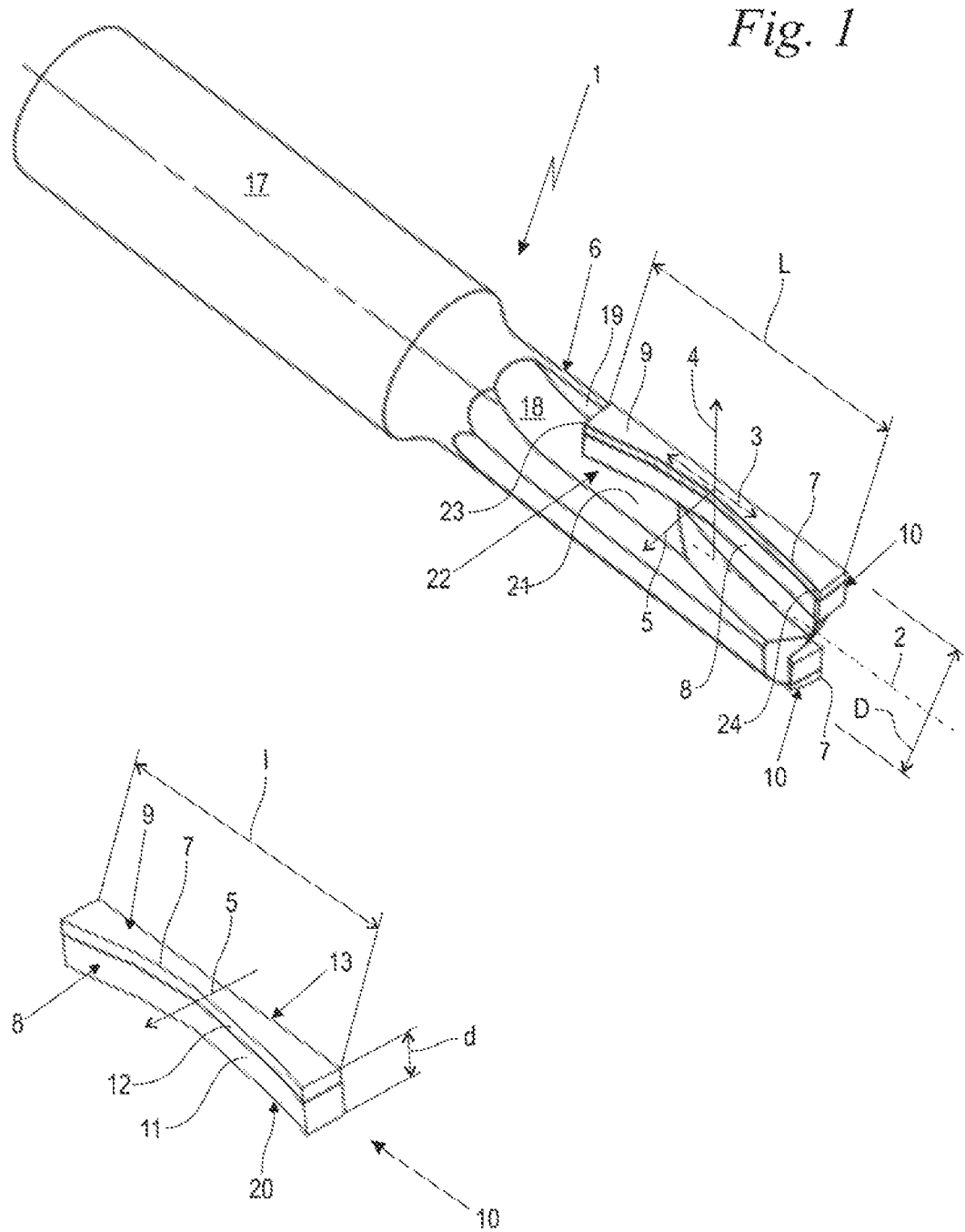

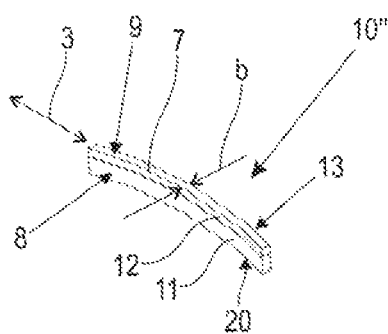
Fig. 5
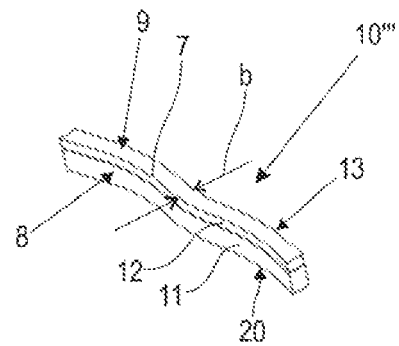
Fig. 6
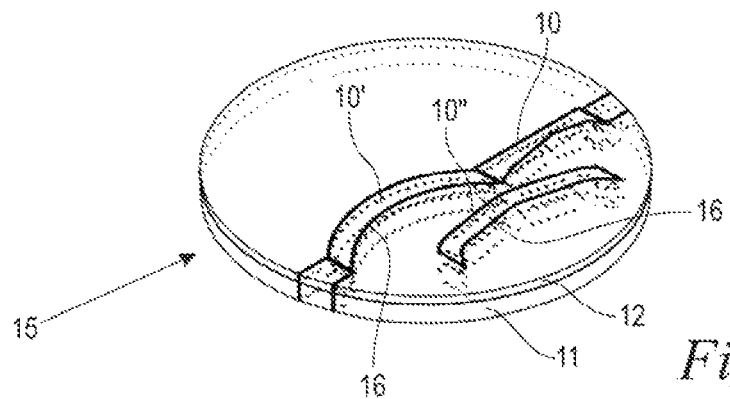
Fig. 7
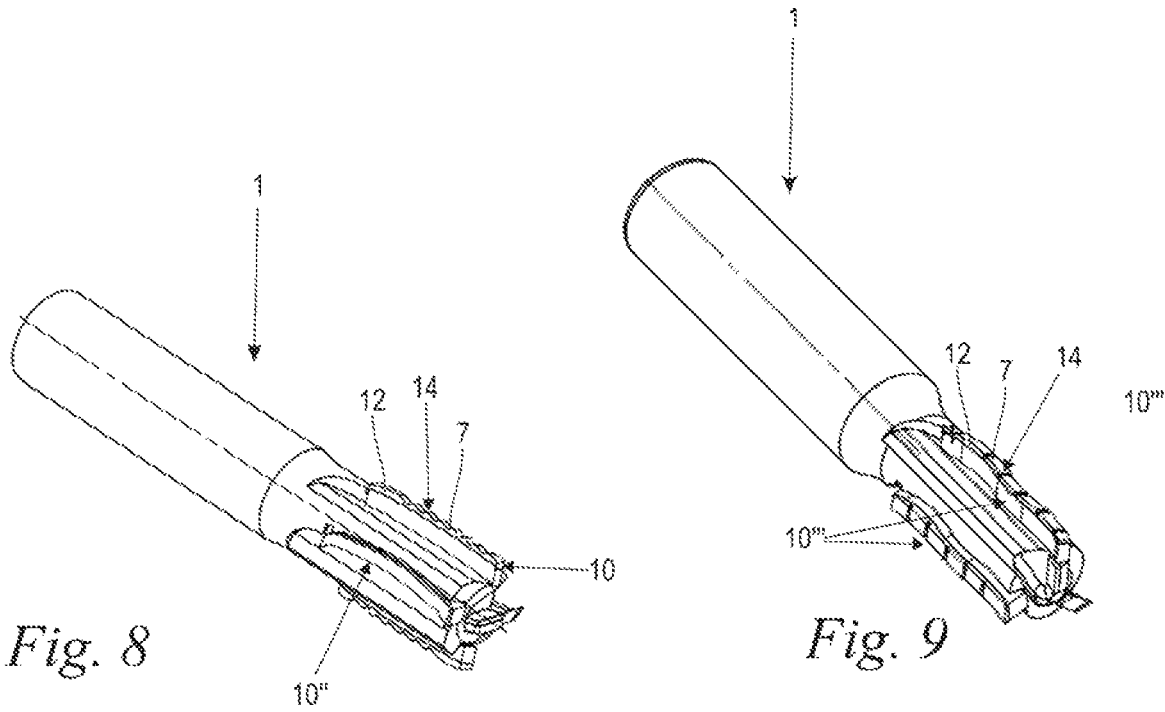
Fig. 8
Fig. 9

MILLING TOOL AND METHOD FOR PRODUCING SUCH A MILLING TOOL

CROSS REFERENCE TO RELATED APPLICATION

This application claims priority of European patent application no. 20 197 948.1, filed Sep. 24, 2020, the entire content of which is incorporated herein by reference.

TECHNICAL FIELD

The disclosure relates to a milling tool and a method for producing such a milling tool.

BACKGROUND

US 2006/0245838 discloses a generic milling tool in the form of an end mill with two concavely curved blades and with rake faces which are concavely curved corresponding thereto. The two individual blades extend continuously and without interruption over the entire cutting length. Such milling tools are used in particular in the machining of sheet material composed of wood or wood-like materials such as chipboard or fiberboard with or without coating. The concavely curved blade brings about that cutting forces arise on both surfaces of the sheet material, which cutting forces are directed into the interior of the workpiece and thus avoid a milling out of the cutting edges.

The milling tool shown is embodied in one piece overall including base body, shaft and blades. In the case of such monolithic tools, the material selection is determined by the demands placed on the blade. If therefore, for example, to achieve a long service life, a hard metal blade is desired, the end mill is composed in its entirety including the shaft of precisely this hard metal. Such tools can indeed achieve good cutting quality and long service lives. However, various disadvantages must also be accepted. The shaping of the shaft or the base body with chip flutes and the like is complex. The concave blades can only be economically produced with a rotating manufacturing tool (milling cutter, grinding disk). The concave shape of the rake face is determined by the smallest possible diameter of the manufacturing tool. The expensive hard metal is also used, apart from the blades, at points where its material properties are not needed in the first place or are even obstructive. A shaft manufactured from hard metal is fragile and also does not have first-class damping properties. Such a tool is overall expensive. The use of even harder blade material such as PCD (polycrystalline diamond) is not possible in the case of the monolithic concept described above according to the prior art.

It is naturally known in addition to this to expand the possibilities of material selection by using separate cutting plates. Shaft and base body of the miller can be made, for example, of tool steel, with hard metal or PCD plates then being soldered on. Such an attachment is known, for example, from WO 2012/163338 A1, a tool base body being provided for each cutting plate with a plate seat and with a chip space. The flat plate seat stands upright, that is, approximately radially to the axis of rotation or transverse to the cutting direction. The associated cutting plate is soldered on with its flat rear side onto the upright plate seat so that its opposite flat front side forms the likewise flat rake face.

In the case of such a construction, no economically viable solution is known to represent a single blade which extends over the entire cutting length from an individual cutting plate with a curved blade and rake face profile. For this, the cutting plate which has a flat basic shape would have to be concavely machined in the soldered-in state on its initially flat front side. Since this front side involves a full-surface PCD layer, it would have to remove very hard and also very expensive material in a large volume. This would on one hand require a corresponding thickness of the PCD layer and on the other hand would be barely possible to carry out in practice due to the effort involved.

For the application discussed above, the above-mentioned combination disclosed in US 2006/0245838 of concavely curved blade and concavely curved rake face is approximated in the configuration according to WO 2012/163338 A1 by several rows of separate, flat cutting plates. For this purpose, the flat cutting plates are inclined with their flat rake faces relative to the longitudinal direction of the tool at an axis angle or angle of inclination: the rake faces of the cutting plates positioned close to the shaft are inclined toward the free tool end, while the rake faces of the cutting plates positioned close to the free tool end are inclined toward the shaft. In other words, the end-side cutting plates face one another. When machining the workpiece, the same effect arises as in the case of the continuously curved blade profile insofar as cutting forces directed into the interior of the workpiece are also generated here on both surfaces of the board material.

However, such constructions also have disadvantages: a chip space and a plate seat must be milled into the tool base body for each of the numerous cutting plates. The high degree of material removal also results, in addition to the high degree of effort involved, in a weakening of the core of the base body. This has the result that valuable materials which are difficult to machine have to be used for the base body. Disadvantages during operation should also be pointed out: in particular in the case of milling tools with small flight circle diameters, the discharge of the amount of heat which arises during machining is limited. This can in turn restrict the performance of the milling tool since otherwise the solder connection between cutting plate and base body can be thermally damaged or even what is known as "desoldering" occurs.

SUMMARY

It is an object of the disclosure to further develop a milling tool such that blades with a curved blade profile and with a curved rake face can be used with simple means without being subject to the above-mentioned restrictions in the case of monolithic tools or in the case of tools with separate cutting plates.

The aforementioned object can, for example, be achieved by a milling tool for the machining of wood or wood-like materials, wherein the milling tool is configured to rotate about an axis of rotation, wherein a longitudinal direction, a radial direction, and a rotational direction are specified by the axis of rotation. The milling tool includes: a base body defining a circumferential side; a blade arranged on the circumferential side of the base body; the blade adjoining a rake face oriented forward in the rotational direction and a flank face oriented outward in the radial direction; the blade and the rake face running in a curved manner in the longitudinal direction; the blade and the rake face being formed on a cutting plate formed separately from the base body; the cutting plate having a flat inner surface opposite the flank face, wherein the flat inner surface faces radially inward toward the base body; the base body defining a flat support surface which corresponds to the flat inner surface;

and, the cutting plate being fastened on the flat support surface of the base body via the flat inner surface.

It is a further object of the disclosure to provide a method for producing such a milling tool.

This object can, for example, be achieved by a method for producing a milling tool for the machining of wood or wood-like materials, the milling tool being configured to rotate about an axis of rotation, wherein a longitudinal direction, a radial direction, and a rotational direction are specified by the axis of rotation, the milling tool including a base body defining a circumferential side and a blade arranged on the circumferential side of the base body, the blade adjoining a rake face oriented forward in the rotational direction and a flank face oriented outward in the radial direction, the blade and the rake face running in a curved manner in the longitudinal direction, the blade and the rake face being formed on a cutting plate formed separately from the base body, the cutting plate having a flat inner surface opposite the flank face, wherein the flat inner surface faces radially inward toward the base body, the base body defining a flat support surface which corresponds to the flat inner surface. The method includes: separating out the cutting plate from a flat blank, wherein the cutting plate is flat and includes the blade running in the curved manner, the rake face running in the curved manner, and the flat inner surface; and, fastening the cutting plate with the flat inner surface in the radial direction pointing inward to the flat support surface of the base body.

The disclosure is based on the concept of a multi-part configuration with a base body and cutting plates fastened thereto. The cutting plates are manufactured from a flat blank and, while maintaining the flat base shape, are provided with a blade running in a curved manner and with a cutting surface running in a curved manner. A likewise maintained surface of the blank is used as the inner surface of the cutting plate which, in the mounted state, lies opposite the radially outer flank face and radially inward faces toward the main body. Corresponding thereto, a flat support surface is formed as a plate seat on the base body, wherein the cutting plate is fastened with its flat inner surface on the flat support surface of the base body and in particular is soldered on.

The configuration according to the disclosure opens up the possibility of using separate cutting plates with very little outlay even if a curved profile of blade and rake face is desired. The curved shape is not generated on the finished tool, but rather already in advance during production of the individual cutting plates. Since the curved rake face extends through the cross-section of the raw material or the composite material blank, controlled cutting guidance in particular by lasering, erosion or the like is sufficient for its shaping without large amounts of the very hard plate materials having to be removed in a complex process. Since the flat surface of the plate material, in the installed state, is not supported in the rotational direction forward on the rake face, but rather inward in the radial direction on the support surface of the base body acting as a plate seat and pointing radially outward, correspondingly narrow plate strips can be used. This makes it possible to obtain a correspondingly high number of cutting plates from the existing blank of a certain geometry and size alongside low material consumption. The expensive plate material is used in a cost-efficient manner. Since the shaping of the curved rake face is not performed on the finished tool by using a grinding disk or eroding disk, but rather already during separation out from the blank, any desired contour profiles can be achieved. It is thus possible, in addition to circular arc portions, to also generate irregularly or multiply curved rake faces as well as those in the form of a curved traverse.

The tool base body, which is preferably made of a different material and in particular from steel, is also easier to produce than in the case of a monolithic tool. It is not necessary to take account of the blade geometry in its manufacture, hence chip spaces, plate seats or the like can be shaped as desired. Moreover, a material can be selected for the base body which, in addition to easy processability, also has good operational properties such as impact strength and damping. In particular the support surface of the base body facing forward primarily radially outward instead of in the rotational direction leads to comparatively only a small amount of material having to be removed from the base body blank during production. In addition to the reduced manufacturing outlay, a larger material cross-section of the base body in comparison with the prior art with higher mechanical and thermal load capacity is above all generated since the remaining material cross-section is acted upon with less mechanical stress and furthermore can discharge a larger quantity of heat.

Advantages of the disclosure particularly come to bear in the case of configurations in which the milling tool has a milling portion with a cutting length and a diameter, the cutting length being larger than half the diameter and in particular larger than the diameter, and/or in the case of which the cutting plate has a plate length and a thickness, the plate length being larger than the thickness, and/or in the case of which the milling tool has a milling portion with a cutting length, the at least one blade extending along the entire cutting length, and/or in the case of which the at least one blade runs between two end points, the end points lying on a line parallel to the longitudinal direction. In terms of all these features, the above-mentioned difficulties arise in the prior art which are overcome by configurations according to the disclosure.

The cutting plates used according to the disclosure can be monolithic, for example, of hard metal or monodiamond. In an advantageous further embodiment, they are manufactured from a composite material blank which includes a carrier layer in particular made of hard metal or a hard layer applied thereon, in particular a PCD layer, a PVD layer or a CVD layer. The flat cutting plate is cut out from this in such a manner that the flank face is formed by the hard layer, that the inner surface opposite the flank face is formed by the carrier layer and that the curved rake face is formed via a cut though the composite material blank. The cutting plate prepared in such a manner is fastened with its carrier layer pointing inward in the radial direction on the support surface of the base body in such a manner that the PCD layer lies outside the carrier layer in the radial direction, that is, points radially to the outside and thereby forms the flank face. Here, the curved rake face is carved out via a cut which maps the corresponding curvature. Despite the use of a flat blank, the curvature of blade and rake face is therefore produced by a curved cutting profile in that the complete hard layer is not used, rather a cross-section through the composite material, that is, through the hard layer and the carrier layer therebelow for the formation of the rake face.

In one preferred embodiment, the blade and the rake face run in a curved manner, while the bearing surface which is opposite in the rotational direction is flat. The assigned supporting surface on the plate seat of the base body should in the same manner be embodied in such a case to be flat corresponding to this, which facilitates the production process.

In an advantageous alternative, the bearing surface is curved in the same direction as the rake face. In particular, the cutting plate has a constant width between the rake face and the bearing surface. As a result of this, an individual cutting plate also has in its end regions a very narrow configuration with a low level of material consumption. Several such cutting plates can be separated out from a blank during production in a manner stacked in one another with a small space requirement so that a correspondingly high yield is achieved.

BRIEF DESCRIPTION OF THE DRAWINGS

The invention will now be described with reference to the drawings wherein:

FIG. 1 shows, in a perspective view, a milling tool embodied according to the disclosure using the example of an end mill with two PCD cutting plates, the PCD layer of which points radially outward and the blades of which have a curved profile in relation to the rake face;

FIG. 2 shows, in a perspective view, an individual cutting plate of the milling tool according to FIG. 1 with details in relation to its configuration including a flat bearing surface;

FIG. 5 shows a variant of the blade according to FIG. 4 with multiple curvature;

FIG. 6 shows a further variant of the blade according to FIG. 4 with a polygonally curved profile;

FIG. 7 shows, in a perspective view, a PCD composite material blank with individual cutting plates to be cut out therefrom;

FIG. 8 shows a further variant of the milling tool according to FIGS. 1 and 3 with a PCD with an undulating contour for the formation of a roughing blade; and, FIG. 9 shows a further variant of the milling tool with a contouring of the PCD layer for the formation of an interrupted blade.

DESCRIPTION OF THE PREFERRED EMBODIMENTS

Figure 3:
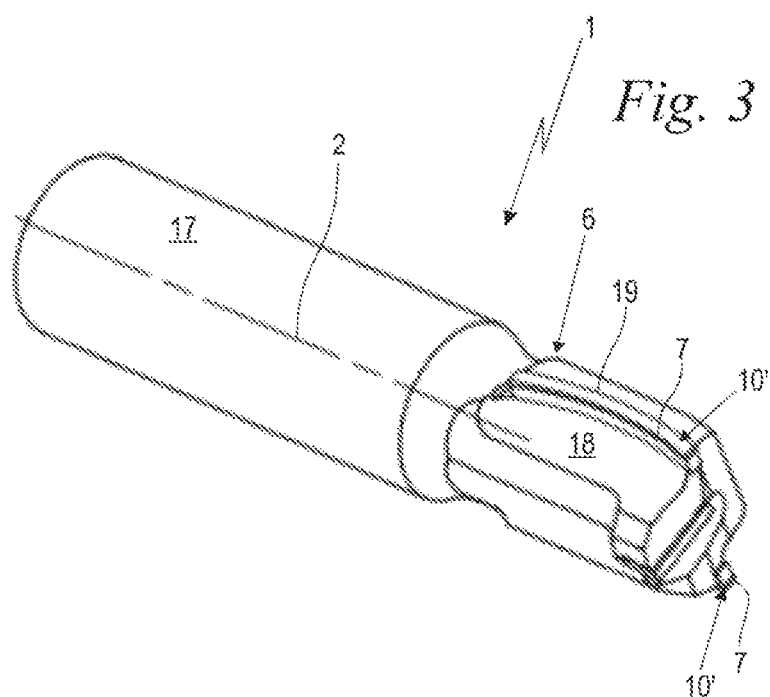
FIG. 3 shows a variant of the milling tool according to FIG. 1 with cutting plates which have a constant width.

FIG. 1 shows, in a perspective view, a milling tool 1 according to the disclosure using the example of an end mill. However, other milling tools, for example, in the form of a side milling cutter or the like can also be provided in the context of the disclosure. In any event, milling tool 1 is configured for the machining in particular of wood or wood-like materials, that is, of chipboard or fiberboard with or without coating. Milling tool 1 has a longitudinal central axis which represents an axis of rotation 2 during operation and wherein milling tool 1 is driven in a rotating manner about this axis of rotation 2.

The milling tool includes a base body 6 which is formed here from a tool portion 18 and a shaft 17 formed in one piece thereon. A multi-part configuration can, however, also be expedient. In any event, at least one blade 7 is arranged on the circumferential side of base body 6, milling tool 1 in the embodiment shown having two blades 7 which lie diametrically opposite one another in relation to axis of rotation 2.

A longitudinal direction 3 runs parallel to axis of rotation 2. A radial direction 4 which proceeds from axis of rotation 2 and runs through blade 7 lies perpendicular thereto. A rotational direction 5 which is produced from the rotational movement of milling tool 1 about axis of rotation 2 also lies perpendicular to longitudinal direction 3 and likewise perpendicular to radial direction 4.

Within tool portion 18, milling tool 1 has a milling portion 22 which is effective for machining with a cutting length L which is covered by the sum of all blades 7. Moreover, milling tool 1 has in its milling portion 22 an active diameter D which is also referred to as the flight circle diameter of blades 7. A conical or other configuration with diameter D which varies along milling portion 22 can be provided in the context of the disclosure. In the present case, the diameter in milling portion 22 is constant, this therefore involving a cylindrical configuration. In its exemplary embodiment as an end mill, milling portion 22 is slim, with cutting length L advantageously being larger than half diameter D. In the preferred embodiment shown, the cutting length is larger than diameter D. Individual blades 7 run in each case between two end points 23, 24, associated end points 23, 24 lying on a joint line parallel to longitudinal direction 3. In the preferred embodiment shown, both blades 7 furthermore extend along entire cutting length L. A split configuration can, however, also be expedient, in the case of which several short blades, arranged in rows next to one another, cover cutting length L.

In blade 7, a rake face 8 pointing forward in rotational direction 5 and a flank face 9 pointing outward in radial direction 4 meet one another. Flank face 9 is formed to be flat, but can also be ground or worked in another form in adaptation to the flight circle or to form a contouring (see below). Blade 7 and adjoining rake face 8 both run in a curved manner in longitudinal direction 3. This preferably involves a concave curvature. An at least partially convex curvature can, however, also be expedient. "Curvature" refers here very generally to a profile which is not straight or not flat and which can also include, in addition to constant curvatures, bends and traverses. The curvature runs here in such a manner that blade 7 and rake face 8 lie in their central region parallel to longitudinal direction 3, while, in their end regions, the associated sub-surfaces of rake face 8 point toward one another. As a result of this, during machining in particular of coated chipboard or fiberboard, it is achieved that the blade regions which point toward one another meet the outer edge layers of the board material. Cutting force components directed inward into the board materials which avoid a breaking out of the coating or the covering layer are generated there.

Blades 7 of milling tool 1 are in each case formed on a flat cutting plate 10 made of a composite material, while base body 6 is manufactured from a different material, here, steel or tool steel. Two identical cutting plates 10 are fastened here to base body 6. An individual cutting plate 10 of this type is represented in perspective in FIG. 2. It is apparent there that the basic composite material includes a carrier layer 11 as well as a hard layer 12. Carrier layer 11 is made, as is commonplace, of hard metal, whereupon in a manner known per se hard layer 12 is applied, for example, using the PVD or CVD method (Physical Vapor Deposition or Chemical Vapor Deposition). Various very hard materials are considered for this. In the present case, hard layer 12 is a PCD layer (polycrystalline diamond). The level of hard layer 12 or its free surface specifies flank face 9, while rake face 8 is formed by a cut through the composite material. The curved profile of blade 7 and rake face 8 is approximated by a traverse in the embodiment shown. A constant curvature, for example, as in the embodiment according to FIG. 6, can, however, also be provided.

Cutting plate 10 has a plate length 1 and a thickness d. It is directly apparent from a combined view with FIG. 1 that plate length 1 is equal to cutting length L. In contrast to the exemplary embodiment, however, shorter plate lengths 1 can also be expedient. In any event, it is clearly apparent that plate length 1 is larger and in particular multiple times larger than thickness d. It is also apparent from the further combined view with FIG. 1 that the direction of thickness d, in the mounted state, coincides substantially with radial direction 4.

A rear bearing surface 13 lies opposite rake face 8 in relation to rotational direction 5, which bearing surface 13 is configured as a flat surface in the embodiment shown. One consequence of this is that cutting plate 10 has the smallest width in its central region and that this width becomes larger toward the ends.

Opposite flank face 9, cutting plate 10 has a flat inner surface 20. It is apparent from the combined view of FIGS. 1 and 2 that cutting plate 10 prepared according to FIG. 2 is mounted on base body 6 or soldered thereto, base body 6 having a support surface 21 corresponding to inner surface 20 of cutting plate 10. In the installed state according to FIG. 2, inner surface 20 of cutting plate 10 radially inwardly faces base body 6, while flat support surface 21 corresponding thereto and formed on base body 6 itself points radially outward and faces inner surface 20 of cutting plate 10. Inner surface 20 lies on support surface 21 acting as a plate seat, a solder connection existing between these. Base body 6 furthermore has as part of the plate seat a likewise flat supporting surface 19 corresponding to bearing surface 13 of cutting plate 10, against which supporting surface 19 cutting plate 10 bears flat with its rear bearing surface 13. Cutting plate 10 is oriented in such a manner that its carrier layer 11 bears in radial direction 4 pointing inward against the bearing surface of base body 6, while hard layer 12 points radially outward, that is, lies outside carrier layer 11 in radial direction 4 and forms flank face 9.

Figure 4:
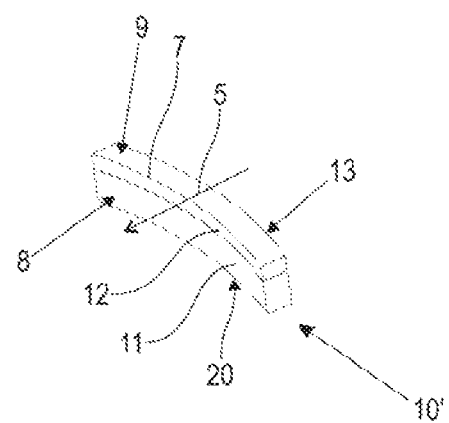
FIG. 4 shows an individual blade of the milling tool according to FIG. 3 with further details of their configuration including a curved rear bearing surface.

FIG. 3 shows, in the perspective view, a variant of milling tool 1 according to FIG. 1 with two cutting plates 10', blades 7 of which are constantly concavely curved. FIG. 4 shows in a perspective single part view a single one of these cutting plates 10', rear bearing surface 13 in rotational direction 5 also being curved. The curvature is selected so that cutting plate 10 has a constant width b between rake face 8 and bearing surface 13 along their longitudinal extent. Corresponding to the curvature of rear bearing surface 13, supporting surface 19 formed in base body 6 is also embodied to be curved so that cutting plate 10' bears flat thereagainst with its rear bearing surface 13 and experiences a flat solder connection there. Unless described otherwise, the embodiment according to FIGS. 3 and 4 corresponds to the embodiment according to FIGS. 1 and 2 in terms of the other features and reference numbers.

FIG. 5 shows in a perspective view a further embodiment of a cutting plate, namely a cutting plate 10" with joint features of the embodiments according to FIGS. 2 and 4: corresponding to FIG. 2, cutting plate 10" according to FIG. 5 has a curved blade 7 as well as a curved rake face 8, the curvature of which follows a traverse in longitudinal direction 3. In contrast to FIG. 2, the same, however, also applies here to rear bearing surface 13 so that cutting plate 10" has a constant width b along longitudinal direction 3 corresponding to FIG. 4. Cutting plate 10" according to the embodiment according to FIG. 6 is also provided with a constant width b, wherein, however, the curvature profile is not simply concave here, but rather is double concave with a convex central portion lying therebetween. The embodiments of FIGS. 2, 4, 5 and 6 correspond to one another in terms of the other features and reference numbers.

FIG. 7 shows in a perspective view a composite material blank 15 in the form of a circular blank. Composite material blank 15 is overall flat and has a lower carrier layer 11 made of hard metal as well as an upper PCD hard layer 12 applied fixedly thereon. All of the configurations considered of a cutting plate 10 including cutting plates 10, 10', 10", 10'" described above are produced according to a method according to the disclosure, according to which they are separated out and isolated via a cut 16 which separates the composite material blank transverse to its plane. By way of example, the profile of a cut 16 is represented here in order to form three different cutting plates 10, 10', 10". In practice, however, the guidance of cut 16 is selected in a nested manner such that as many identical cutting plates 10 as possible can be separated out and obtained from a circular blank or from a composite material blank 15.

It is apparent from the combined view of FIG. 7 with the other figures that later flank face 9 of an individual cutting plate 10 is formed by the free surface of hard layer 12 of the PCD composite material, while inner surface 20 of respective cutting plate 10 is formed by the free, flat surface of carrier layer 11. The latter does not require any geometric finishing and can be used directly as a soldering surface for fastening to support surface 21. The cutting surface formed by cut 16 forms itself, in addition to rear bearing surface 13, above all also front curved rake face 8 and blade 7 curved in the same manner. Cutting plate 10 prepared in such a manner is then fastened to main body 6 of milling tool 1, for example, by hard soldering. A subsequent working out of the curved profile of blade 7 and rake face 8 is no longer necessary in the mounted or soldered state. Reworking is restricted to the sharpening of the blade and potential correction of flank face 9, as shown below:

FIGS. 8 and 9 show yet further variants of a milling tool embodied according to the disclosure. In the embodiment according to FIG. 8, two further blades 10 are also mounted in addition to the two blades 10" according to FIG. 6, hard layer 12 of which further blades 10 is provided on the outside, that is, in the region of blade 7 and flank face 9 with an undulating contouring 14. A zigzag shape can also be expedient instead of a wave shape. In any event, as a result of this, assigned blade 7 is formed as a roughing blade, as a result of which the cutting forces which arise are reduced. In the embodiment according to FIG. 9, a total of three blades 10'" distributed evenly over the circumference according to FIG. 6 are mounted, wherein their PCD layer 12 is also provided with a contouring 14 in the region of blade 7 and flank face 9. Here, contouring 14 includes [in] regular interruptions of hard layer 12 otherwise maintained as flat as well as blade 7, as a result of which cutting force and chip formation can be expediently influenced. It otherwise also applies to the embodiments according to FIGS. 8 and 9 that they correspond to the embodiments described above in terms of all the further features and reference numbers.

It is understood that the foregoing description is that of the preferred embodiments of the invention and that various changes and modifications may be made thereto without departing from the spirit and scope of the invention as defined in the appended claims.

What is claimed is:
1. A milling tool for the machining of wood or wood-like materials, wherein the milling tool is configured to rotate about an axis of rotation, wherein a longitudinal direction, a radial direction, and a rotational direction are specified by the axis of rotation, the milling tool comprising:

a base body defining a circumferential side;

a blade arranged on said circumferential side of said base body;

said blade adjoining a rake face oriented forward in the rotational direction and a flank face oriented outward in the radial direction;

said blade and said rake face running in a curved manner in the longitudinal direction;

said blade and said rake face being formed on a cutting plate formed separately from said base body;

said cutting plate having a flat inner surface opposite said flank face, wherein said flat inner surface faces radially inward toward said base body;

said base body defining a flat support surface which corresponds to the flat inner surface;

said cutting plate being fastened on said flat support surface of the base body via said flat inner surface;

wherein said cutting plate is formed from a composite material with a carrier layer and with a hard layer;

said cutting plate is fastened to said base body with said carrier layer directed inward in the radial direction; and, said hard layer lies outside said carrier layer in the radial direction and forms said flank face.

2. The milling tool of claim 1, wherein said cutting plate is soldered on said flat support surface of said base body via said flat inner surface of said cutting plate.

3. The milling tool of claim 1, wherein the milling tool has a milling portion with a cutting length and a diameter, said cutting length being larger than half said diameter.

4. The milling tool of claim 1, wherein the milling tool has a milling portion with a cutting length and a diameter, said cutting length being larger than said diameter.

5. The milling tool of claim 1, wherein said cutting plate has a plate length and a thickness; and, said plate length is larger than said thickness.

6. The milling tool of claim 1, wherein the milling tool has a milling portion with a cutting length; and, said blade extends along an entirety of said cutting length.

7. The milling tool of claim 1, wherein said blade runs between two end points; and, said two end points lie on a line parallel to the longitudinal direction.

8. The milling tool of claim 1, wherein said hard layer is a PCD layer, a PVD layer or a CVD layer.

9. The milling tool of claim 6, wherein said cutting plate is cut out from a flat composite material blank with a carrier layer and with a hard layer in such a manner that said flank face is formed by said hard layer; said flat inner surface opposite said flank face is formed by said carrier layer; and, said rake face is formed via a cut through said plate blank.

10. The milling tool of claim 1, wherein said blade and said rake face run in a curved manner; said cutting plate has a bearing surface disposed opposite of said rake face in relation to the rotational direction; and, said bearing surface is flat.

11. The milling tool of claim 1, wherein said blade and said rake face run in a curved manner; said cutting plate has a bearing surface disposed opposite of said rake face in relation to the rotational direction; and, said cutting plate has a constant width between said rake face and said bearing surface.

12. The milling tool of claim 1, wherein said flank face defines a contouring incorporated in said flank face.

13. The milling tool of claim 1, wherein said base body is formed from a first material; and, said cutting plate is formed from a second material which is different from said first material.

* * * * *

UNITED STATES PATENT AND TRADEMARK OFFICE
CERTIFICATE OF CORRECTION

PATENT NO. : 12,304,104 B2
APPLICATION NO. : 17/479746
DATED : May 20, 2025
INVENTOR(S) : Oliver Galli Page 1 of 1

It is certified that error appears in the above-identified patent and that said Letters Patent is hereby corrected as shown below:

In the Specification

In Column 8:
Line 50: delete "[in]".

Signed and Sealed this
Fifth Day of August, 2025

Coke Morgan Stewart
*Acting Director of the United States Patent and Trademark Office*